(12) United States Patent
Tagashira

(10) Patent No.: US 9,199,373 B2
(45) Date of Patent: Dec. 1, 2015

(54) ROBOT CONTROL DEVICE AND CONTROL METHOD

(75) Inventor: Ryuma Tagashira, Fukuyama (JP)

(73) Assignee: RORZE CORPORATION, Hiroshima (JP)

( * ) Notice: Subject to any disclaimer, the term of this patent is extended or adjusted under 35 U.S.C. 154(b) by 196 days.

(21) Appl. No.: 13/702,147

(22) PCT Filed: Nov. 22, 2011

(86) PCT No.: PCT/JP2011/076908
§ 371 (c)(1),
(2), (4) Date: Dec. 5, 2012

(87) PCT Pub. No.: WO2012/070572
PCT Pub. Date: May 31, 2012

(65) Prior Publication Data
US 2013/0085606 A1    Apr. 4, 2013

(30) Foreign Application Priority Data

Nov. 26, 2010 (JP) .................... 2010-263663

(51) Int. Cl.
*B25J 9/10* (2006.01)
*B25J 9/16* (2006.01)

(52) U.S. Cl.
CPC . *B25J 9/10* (2013.01); *B25J 9/1664* (2013.01)

(58) Field of Classification Search
CPC ........... G05B 2219/40512; G05B 2219/40514; G05B 2219/40519; G05B 2219/34093; G05B 2219/34095; G05B 2219/34096; G05B 2219/34098; G05B 2219/34101; G05B 2219/43129
See application file for complete search history.

(56) References Cited

U.S. PATENT DOCUMENTS

| 4,550,383 | A | * | 10/1985 | Sugimoto | ...................... 700/262 |
| 5,025,362 | A | * | 6/1991 | Darlington et al. | ............. 700/63 |

(Continued)

FOREIGN PATENT DOCUMENTS

| JP | 8-123531 | | 5/1996 | |
| JP | 8123531 | * | 5/1996 | ........... G05B 19/416 |

(Continued)

OTHER PUBLICATIONS

International Search Report issued Apr. 24, 2012 in International (PCT) Application No. PCT/JP2011/076908.

*Primary Examiner* — Khoi Tran
*Assistant Examiner* — Ryan Rink
(74) *Attorney, Agent, or Firm* — Wenderoth, Lind & Ponack, L.L.P.

(57) ABSTRACT

A robot control apparatus and a control method for moving a tool along a synthesized trajectory where at least two operations are synthesized in the middle of a desired trajectory. Control positions for a preceding operation and those for a succeeding operation are calculated from initial to terminal values, respectively. With a requirement that initial values for the succeeding operation be matched to terminal values for preceding operation, target control positions at a predetermined time for an actuator in a section where a tool is moved along the synthesized trajectory are calculated on the basis of values obtained by adding values of a difference between the predetermined time and a previous time for the preceding operation to values of a difference between the predetermined time and the previous time for the succeeding operation, and the actuator is controlled such that calculated target control positions are attained.

13 Claims, 10 Drawing Sheets

(56) References Cited

U.S. PATENT DOCUMENTS

| | | | |
|---|---|---|---|
| 5,276,383 A * | 1/1994 | Nishimura et al. | 318/568.15 |
| 5,859,515 A * | 1/1999 | Takizawa et al. | 318/560 |
| 6,246,923 B1 * | 6/2001 | Sugimura et al. | 700/218 |
| 2006/0197486 A1 * | 9/2006 | Kubo et al. | 318/568.12 |
| 2009/0171505 A1 | 7/2009 | Okazaki | |

FOREIGN PATENT DOCUMENTS

| | | |
|---|---|---|
| JP | 8-328627 | 12/1996 |
| JP | 2006-243926 | 9/2006 |
| JP | 2008-302496 | 12/2008 |
| WO | 97/34742 | 9/1997 |

* cited by examiner

ROBOT CONTROL DEVICE AND CONTROL METHOD

TECHNICAL FIELD

The present invention relates to a robot control apparatus, and particularly relates to a robot control apparatus and a control method for causing a robot to move a tool along a synthesized trajectory where a plurality of trajectories are synthesized.

BACKGROUND ART (Conventional Art 1)

The patent document 1 mentioned below discloses an invention which relates to controlling a workplace transfer robot configured as a vertically articulated robot for transferring a workpiece to a press machine. Specifically, with the invention, a control is performed which, as shown in FIG. 1, in moving a hand of a workpiece transfer robot from a movement starting position R1 to a movement ending position R3, starts, prior to a first operation of moving the robot hand from the movement starting position R1 to a halfway position R2 having been completed, a second operation of moving it from a point on this side of the halfway position R2 to the movement ending position R3, thereby moving the robot hand along a smooth corrected movement route 310 in the vicinity of the halfway position R2 (FIG. 9 in patent document 1 to be referenced). In this case, as with a linear movement route, the consecutive movement positions for the respective control time intervals on the corrected movement route 310 are calculated; the calculated movement positions are inverse-transformed to determine the target positions for the respective axes of the robot: and by controlling the respective axes of the robot such that the target positions determined are attained, the robot hand is moved along the corrected movement route 310 (the paragraph 0063 and paragraphs 0077 to 0079 and FIG. 3 in patent document 1 to be referenced).

(Conventional Art 2)

The patent document 2 mentioned below discloses an invention which relates to controlling a workpiece transfer robot 300 configured as a horizontally articulated robot for earning in and out a semiconductor wafer W, as shown in FIG. 2. Specifically, with the invention, a control is performed which, as shown in FIG. 2, causes arms 301 and 302 of the workpiece transfer robot 300 configured as a horizontally articulated robot to make a telescoping operation for linearly moving a hand 303 carrying the semiconductor wafer W from a point Q1 toward a point Q2; then, causes the hand 303 to move from a point Q5 on this side of the point Q2 to a point Q6 such that the point Q2 is bypassed or "shortcut" along a shortcut trajectory where the arm telescoping operation and the turning operation are synthesized; then, causes the arms 301 and 302 to make a turning operation from the point Q6 toward a point Q3; their causes the hand 303 to move from a point Q7 on this side of the point Q3 to a point Q8 along a shortcut trajectory such that the point Q3 is bypassed or "shortcut"; and then, causes the arms 301 and 302 to make a telescoping operation to cause the hand 303 carrying the semiconductor wafer W to linearly move from the point Q8 to a point Q4 (FIG. 3 in patent document 2 to be referenced). In this case, in moving the hand 303 of the workpiece transfer robot 300 along the shortcut trajectory, the respective axes of the robot are drive controlled such that the hand 303 of the workpiece transfer robot 300 is moved at a speed according to a speed pattern which synthesizes a speed pattern necessary for the telescoping operation of the arras and a speed pattern necessary for the turning operation (FIG. 19 in patent document 2 to be referenced).

Patent Document 1
    Japanese Patent Application Unexamined Publication No. 2006-243926 (especially, paragraphs 0063, and 0077 to 0079, and FIG. 3 and FIG. 9 to be referenced)

Patent Document 2
    International Publication No. WO97/34742 (especially, FIG. 3 and FIG. 19)

DISCLOSURE OF THE INVENTION

Problems to be Solved by the Invention

According to the conventional art 1, the band of the workpiece transfer robot is moved along the corrected movement route 310 substantially in the shape of a circular arc in the figure, and therefore, unlike the case in which the robot hand is moved along the linear movement route connecting between the positions R1 and R2 and the linear movement route connecting between the positions R2 and R3, there is no need for stopping the robot band in the midway position (R2). Consequently, the workpiece can be smoothly transferred at a higher speed.

However, in order to move the hand of the workpiece transfer robot along the corrected movement route 310 substantially in the shape of a circular arc, it is required that the corrected movement route 310 be previously determined by circular interpolation or teaching. This is because, unless the corrected movement route 310 is previously determined, the target positions of the respective axes of the robot corresponding to the consecutive movement positions of the robot hand on the corrected movement route 310 for the respective control time intervals cannot be determined. Thus, with the conventional art 1, in order to control the respective axes of the robot, it is required that the corrected movement route 310 substantially in the shape of a circular arc be previously determined, thereby there has been a problem that it takes much time for implementing the arithmetic processing as the preprocessing for the robot control.

Likewise, with the conventional art 2, the hand 303 of the workpiece transfer robot 300 is moved along the shortcut trajectory substantially in the shape of a circular arc that bypasses or "shortcuts" the point Q2, and the shortcut trajectory which bypasses or "shortcuts" the point Q3, and therefore, unlike the case where the robot hand 303 is moved along the linear trajectory Q5 to Q2, then along the turning trajectory P2 to P3, and then along the linear trajectory Q3 to Q4, the robot hand 303 need not be stopped at the point Q2 and the point Q3. Therefore, the workpiece W can be smoothly carried in and out at a higher speed.

However, also with the conventional art 2, as with the conventional art 1, in order to move the hand 303 of the workpiece transfer robot 300 along the shortcut trajectory substantially in the shape of a circular arc, it is required that the shortcut trajectory be previously determined by circular interpolation or teaching. This is because, unless the shortcut trajectory is previously determined, the target positions of the respective axes of the robot corresponding to the consecutive movement positions of the robot hand 303 on the shortcut trajectory for the respective control time intervals cannot be determined, thereby the robot hand cannot be moved at a desired speed according to the synthesized speed pattern. Thus, also with the conventional art 2, as with the conventional art 1, in order to control the respective axes of the robot, it is required that the shortcut trajectory substantially in the shape of a circular arc be previously determined, thereby there has been a problem that it takes much time for implementing the arithmetic processing as the preprocessing for the robot control.

As described above, the conventional art suggests a concept that the tool (robot hand) is moved along a synthesized trajectory (a shortcut trajectory) where two operations (a linear operation and a turning operation) are synthesized in the middle of a desired trajectory (for example, point Q1 to point Q4 in FIG. 2), however, the state of the conventional art remains, at best, performing a speed control of the tool according to a synthesized speed pattern which synthesizes the speed patterns, and there has been a problem that, in order to control the respective axes of the robot (the actuators for driving the respective axes of the robot), it is essential to make the arithmetic processing for determining the synthesized trajectory.

The present invention has been made in view of such a problem, and it is an object of the present invention to provide a solution with which, in moving the tool along a synthesized route where at least two operations are synthesized in the middle of a desired trajectory, the need for the arithmetic processing, to determine the synthesized trajectory is eliminated, thereby the processing time required for preprocessing for the robot control being drastically reduced.

Means for Solving the Problems

In accordance with a first aspect of the present invention, there is provided a robot control apparatus, having an actuator, and changing a control, value for the actuator for each predetermined control cycle for shifting a tool of a robot from a movement starting point to a movement ending point along a desired trajectory, the control apparatus, being applied in moving the tool along a synthesized trajectory where at least two operations are synthesized in the middle of the desired trajectory, and including:

virtual operation starting/ending point searching means that searches a virtual operation starting/ending point such that a virtual operation ending point for a preceding operation to be performed before the tool getting into the synthesized trajectory matches a virtual operation starting point for a succeeding operation to be performed also after the tool getting out of the synthesized trajectory;

control value calculation means that calculates a control value for preceding operation for implementing the preceding operation from an initial value to a terminal value, and calculating a control value for succeeding operation for implementing the succeeding operation from an initial value to a terminal value such that the preceding operation is ended at the virtual operation starting/ending point, and the succeeding operation is started from the virtual operation starting/ending point temporally before the preceding operation being ended;

actuator target control value calculation means that calculates, with a requirement that the initial value of the control value for succeeding operation he matched to the terminal value of the control value for preceding operation being added, a target control value for this time for the actuator in a section where the tool is moved along die synthesized trajectory, on the basis of a value obtained, by adding a value of difference between a value for this time and a value for a previous time of the control value for preceding operation to a value of difference between a value for this time and a value for a previous time of the control value for succeeding operation; and control means that controls the actuator such that the calculated target control value is attained, thereby the tool being moved along the synthesized trajectory.

In accordance with a second aspect of the present invention, there is provided the robot control apparatus of the first aspect of the present invention, in which the robot is a workpiece transfer robot having a hand for transferring a workpiece as the tool.

In accordance with a third aspect of the present invention, there is provided the robot control apparatus of the first or second aspect of the present invention, in which the actuator is a plurality of motors, and the control value for preceding operation and the control value for succeeding operation are calculated as control positions of a plurality of motors corresponding to a position of the tool, respectively.

In accordance with a fourth aspect of the present invention, there is provided the robot control apparatus of the first or second aspect of the present invention, in which the actuator is a plurality of virtual motors, the virtual motors are designated in correspondence to the at least two operations, and the control value for preceding operation and the control value for succeeding operation are calculated as control values for the virtual motors corresponding to the preceding operation and control values for the virtual motors corresponding to the succeeding operation, respectively.

In accordance with a fifth aspect of the present invention, there is provided the robot control apparatus of any one of the first to fourth aspects of the present invention, in which the control value for preceding operation and the control value for succeeding operation are calculated as function values for each consecutive control cycle, respectively.

In accordance with a sixth aspect of the present invention, there is provided a robot control method for a robot having an actuator, changing a control value for the actuator for each predetermined control cycle for shifting a tool of the robot from a movement starting point to a movement ending point along a desired trajectory, the control method, being applied in moving the tool along a synthesized trajectory where at least two operations are synthesized in the middle of the desired trajectory, and comprising:

calculating a virtual operation starting/ending point such that a virtual operation ending point of a preceding operation to be performed before the tool getting into the synthesized trajectory matches a virtual operation starting point of a succeeding operation to be performed also after the tool getting out of the synthesized trajectory, calculating a control value for preceding operation for implementing the preceding operation from an initial value to a terminal value, and calculating a control value for succeeding operation for implementing the succeeding operation from an initial value to a terminal value such that the preceding operation is ended, at the virtual operation starting/ending point, and the succeeding operation is stalled, from the virtual operation starting/ending point, temporally before the preceding operation being ended;

calculating, with a requirement that the initial value of the control value for succeeding operation be matched to the terminal value of the control value for preceding operation being added, a target control value for this time for the actuator in a section where the tool is moved along the synthesized trajectory, on the basis of a value obtained by adding a value of difference between a value for this time and a value for a previous time of the control value for preceding operation to a value of difference between a value for this time and a value for a previous time of the control value for succeeding operation; and controlling the actuator such that the calculated target control value is attained, thereby the tool being moved along the synthesized trajectory.

In accordance with a seventh aspect of the present invention, there is provided the robot control apparatus of the first aspect of the present invention, in which a transform function for preceding operation to calculate the control value for preceding operation from the initial value to the terminal value is previously prepared, while a transform function for succeeding operation to calculate the control value for succeeding operation from the initial value to the terminal value is previously prepared, and for each predetermined control cycle, the transform function for preceding operation is used to calculate the control value for preceding operation, while the transform function for succeeding operation is used to calculate the control value for succeeding operation.

In accordance with an eighth aspect of the present invention, there is provided the robot control apparatus of the sixth aspect of the present invention, in which a transform function for preceding operation to calculate the control value for preceding operation from the initial value to the terminal value is previously prepared, while a transform function for succeeding operation to calculate the control value for succeeding operation from the initial value to the terminal value is previously prepared, and for each predetermined control cycle, the transform, function for preceding operation is used to calculate the control value for preceding operation, while the transform function for succeeding operation is used to calculate the control value for succeeding operation.

Effect of the Invention

In accordance with the present invention, as shown in FIG. 6 and FIG. 8, the control values for preceding operation (A1nA, A2nA, and A3nA) for implementing the preceding operation (the linear operation A from P1 to P2) are calculated from the initial values (A1sA, A2sA, and A3sA) to the terminal values (A1EA, A2EA, and A3EA), and the control values for succeeding operation (B1nB, B2nB, and B3nB) for implementing the succeeding operation (the linear operation B from P2 to P3) are calculated from the initial values (B1sB, B2sB, and B3sB) to the terminal values (B1EB, B2EB, and B3EB).

In this case, a transform function FA for preceding operation to calculate the control value for preceding operation from the initial value to the terminal value is previously prepared, while a transform function FB for succeeding operation to calculate the control value for succeeding operation from the initial value to the terminal value is previously prepared, and, for each, predetermined control cycle, the transform function FA for preceding operation is used to calculate the control value for preceding operation, while the transform function FB for succeeding operation is used to calculate the control value for succeeding operation (the seventh aspect of the present invention and the eighth aspect of the present invention).

On the basis of the control values for preceding operation (A1nA, A2nA, and A3nA), and the control values for succeeding operation (B1nB, B2nB, and B3nB) thus obtained, with a requirement that the initial values (B1sB, B2sB, and B3sB) of the control values for succeeding operation be matched to the terminal values (A1EA, A2EA, and A3EA) of the control values for preceding operation, i.e., a requirement that (B1sB=A1EA, B2sB=A2EA, and B3sB=A3EA), being added, the target control values (M1n, M2n, and M3n) for the actuator for this time in a section where the tool is moved along the synthesized trajectory (AB) are calculated on the basis of the values, i.e., ((A1nA−A1aA−1)+(B1nB−1), (A2nA−1)+(B2nB−1), and (A3nA−1)+(B3nB−1)), which are given by adding the values of difference between the value for this time and the value for a previous time for preceding operation, i.e., (A1nA−1, A2nA−1, and A3nA−1), to the values of difference between the value for the nth time around control value and the value for a previous time of the control value for succeeding operation, i.e., (B1nB−B1nB−1, B2nB−1, and B3nB−1), respectively, and by controlling the actuator such that the target control values thus calculated are attained, the tool can be moved along the synthesized trajectory.

In this way, the control values on the synthesized trajectory (the substantially circular arc trajectory AB from P4 to P5) are determined from the control values for preceding operation and the control values for succeeding operation, and there is no need for previously determining the synthesized trajectory. The control values for preceding operation and the control values for succeeding operation are obtained for each predetermined control cycle during the control operation, and there is no need for the preprocessing which previously determines these control values and stores them in a predetermined memory.

Therefore, the time required for preprocessing which previously calculates the synthesized trajectory can be shortened. Further, it is only necessary that the transform function for preceding operation FA for determining the control values for preceding operation, and the transform function for succeeding operation FB for determining the control values for succeeding operation be previously prepared, and there is no need for preparing a special function for determining the control values on the synthesized trajectory.

In this way, in accordance with the present invention, there is no need, in moving the tool along the synthesized trajectory where at least two operations are synthesized in the middle of a desired trajectory, for the preprocessing which previously determines the synthesized trajectory, and a special function for determining the control values on the synthesized trajectory, whereby the processing time required for preprocessing for the robot control can be drastically shortened. As a result of this, the load of the arithmetic processing is reduced, which allows simplification of the robot control system.

BEST MODE FOR CARRYING OUT THE INVENTION

Hereinbelow, an embodiment of a robot control apparatus and a control method in accordance with the present invention will be described with reference to the drawings.

The following explanation, will be made by assuming a workpiece transfer robot which is configured as a horizontally articulated robot for transferring a semiconductor wafer, a liquid crystal substrate, or the like.

FIG. 3 is a drawing illustrating a configuration, of a robot control system, of the embodiment.

As shown in FIG. 3, the robot control system is basically composed of a commanding PC (personal computer) 30, a robot controller 40, motor drivers 51, 52, and 53, and a robot 10.

As shown in a perspective view in FIG. 3, the robot 10 is a horizontally articulated robot having a first axis 1, a second axis 2, and a third axis 3. The robot 10 includes a pedestal 29, a first link 21, a second link 22, a hand 23, a motor 11, a motor 12, and a motor 13.

The motors 11, 12 and 13 constitute an actuator for driving the respective axes 1, 2, and 3 of the robot 10, respectively. In this embodiment, the motors 11, 12, and 13 are rotary motion actuators driven with a "control position (a rotating position)" given as a "control value". The motor 11 is an actuator for rotating the first axis 1, the motor 12 is an actuator for rotating the second axis 2, and the motor 13 is an actuator for rotating the third axis 3.

One end of the first link 21 is rotatably connected to a pedestal 29, and is relatively rotated in a horizontal direction with respect to the pedestal 29 with the first axis 1 being rotated. One end of the second link 22 is rotatably connected to the other end of the first link 21, and is relatively rotated in a horizontal direction with respect to the first link 21 with the second axis 2 being rotated. The hand 23 carries a workpiece W thereon, and in some cases, constitutes a tool having a mechanism for holding the workpiece W, being rotatably connected to the other end of the second link 22, and with the third axis 3 being rotated, is relatively rotated in a horizontal direction with respect to the second link 22. In the figure, a mechanism including a motor for moving the pedestal 29 in a vertical direction, and the like is not shown.

The motor 11 is provided in a location where, for example, the axis of rotation matches the first axis 1. Likewise, the motor 12 is provided in a location where, for example, the axis of rotation matches the second axis 2. Likewise, the motor 13 is provided in a location where, for example, the axis of rotation, matches the third axis 3.

FIGS. 4A and 4B are drawings conceptually showing the motion of the robot 10 in a horizontal plane, giving an example of change in position and posture of the robot 10, FIG. 4A showing the state before the respective axes 1, 2 and 3 being rotated, and FIG. 4B the state after the respective axes 1, 2 and 3 being rotated.

By drive controlling the motors 11, 12 and 13 to rotate the respective axes 1, 2, and 3 counterclockwise or clockwise as shown with an arrow in the figure, a reference point 23a in the hand 23 (for example, the center point of the hand 23; hereinafter referred to as a hand position 23a) can be moved along a desired trajectory in a horizontal direction for transferring the workpiece W from a movement starting point P1 to a movement ending point P3.

FIGS. 5A and 5B illustrate the relationship between the trajectory and the drive control command for the respective motors 11, 12 and 13 in a case where the hand position 23a makes a linear operation and in a case where the hand position 23a makes a turning operation, respectively.

As shown in FIG. 5A, by drive controlling the motor 11, motor 12, and motor 13 at a speed ratio of 1:−2:1, respectively, the band position 23a can make a linear operation. By reversing the direction of rotation of the motor 11, motor 12, and motor 13, the direction in which the hand position 23a makes a linear operation can be reversed (from an extending direction to a retracting direction, or vice versa).

As shown in FIG. 5B, by stopping the rotation, of the motors 12 and 13, and drive controlling only the motor 11, the hand position 23a can make a turning operation. By reversing the direction of rotation of the motor 11, the direction in which the hand position 23a makes a turning operation can be reversed (from counterclockwise to clockwise direction, or vice versa).

FIG. 6 shows one example of trajectory in the embodiment. In the embodiment, the band position 23a is moved from a movement starting point P1 to a movement ending point P3 along a trajectory C. This trajectory C includes a synthesized trajectory AB where a linear operation A and a linear operation B are synthesized in the middle of the trajectory C.

In FIG. 3, the commanding PC 30, the robot controller 40 and the motor drivers 51, 52 and 53 constitute an apparatus for drive controlling the motors 11, 12, and 13.

Specifically, the commanding PC 30 issues a movement command for instructing a movement to the movement ending point P3 on the trajectory C, which is input to the robot controller 40.

The robot, controller 40 includes a virtual operation starting/ending point searching means 41, a control value calculation means 42, an actuator target control value calculation means 43, a driver communication unit 45 constituting a control means 44, and a memory 46. The virtual operation starting/ending point searching means 41, the control value calculation means 42, and the actuator target control value calculation means 43 are constituted by a CPU, sequentially implementing arithmetic processing in accordance with a control program illustrated in FIG. 7 and specifically in FIG. 8, using data stored in the memory 46. The actuator target control value calculation means 43 finally determines the target control position of the respective motors 11, 12, and 13 for each of the control cycles.

The target control positions of the respective motors 11, 12 and 13 for each of the control cycles are given to the driver communication unit 45. The driver communication unit 45 gives a position command to the motor drivers 51, 52 and 53 for positioning the respective motors 11, 12 and 13 in the target control positions through art interface, respectively. The motor drivers 51, 52 and 53 constitute the control means 44. The motor drivers 51, 52 and 53 output a drive signal corresponding to a position command to the motors 11, 12, and 13, respectively.

Thereby, the motors 11, 12, and 13 are drive controlled to be positioned in the target control positions for each of the control cycles, resulting in the hand position 23a being moved from the movement starting point P1 to the movement ending point P3 along the trajectory C.

Hereinbelow, the steps of the processing which is performed in the flowcharts FIG. 7 and FIG. 8 will be described with reference to FIG. 6 as well.

FIG. 7 schematically shows the flow of the processing performed in the robot controller 40.

First, it is judged whether a movement, command has been input from the commanding PC 30 (step 101).

If it is judged that the movement command has been input (if Y has been answered at step 101), then the respective operations A and B for implementing the movement command input are determined (step 102).

Next, for the respective operations A and B, a control position is calculated (steps 103 and 104).

Next, values of difference between the control positions for the respective operations A and B are added to determine a target control position for moving the hand position 23a along the trajectory C (step 105).

Next, the motors 11, 12, and 13 are controlled such that the hand position 23a is positioned in the target control position (step 106).

FIG. 8 illustrates the processing at steps 102 to 105 in FIG. 7 in detail.

(Searching of Virtual Operation Starting/Ending Point P2)

At step 102 in FIG. 7, the operation A and the operation B are determined, and the virtual operation starting/ending point P2, which provides a virtual operation ending point for the operation A and a virtual operation starting point for the operation B, is searched.

In the memory 46, there is stored restriction data winch restricts the motion of the hand 23, including the current position P1 of the hand position 23a. The restriction data is previously stored in consideration of the current position and posture of the robot 10, the known, dimensions of the working environment (for example, a semiconductor manufacturing apparatus) for the robot 10, the working range of the robot 10, and the like.

First, the movement ending point given as a movement command is P3, however, assuming that, the movement ending point P3 is located, for example, inside a gate 90 of a process chamber, a restriction that the workpiece W most be carried in a perpendicular direction with respect to the gate 90 will uniquely define the direction of movement V3 at the movement ending point P3 as a perpendicular direction with respect to the same gate 90.

In addition, it is assumed that there is a restriction that, in the movement section in the vicinity of the movement ending point P3, turning operation is impossible, and only the linear operation can be performed.

Therefore, in consideration of these restriction data, it can be understood that, in order to move the hand position 23a to the movement ending point P3, the linear operation B to the movement ending point P3 in a direction of movement V3 most be performed.

The current position P1 of the hand position 23a is given as, for example, the movement ending position on the trajectory by a movement command at the previous time, or a measuring position of the hand position 23a. The direction of movement V1 in the current position P1 of the hand position 23a is given as a direction of movement in the movement ending position on the trajectory by the movement command at the previous time. If the movement command at this time is an initial movement command, and is not subjected to any restriction by the movement command at the previous time in the direction of movement at the movement starting point P1, an optimum direction of movement V1 can be defined in consideration of the working environment. In addition, it is assumed that there is a restriction that, in the movement section in the vicinity of the movement starting point P1, only the linear operation can be performed.

Therefore, in consideration of these restriction data, it can be understood that, in order to move the hand position 23a from the movement starting point P1, the linear operation A from the movement starting point P1 as a starting point in a direction of movement V1 must be performed.

In addition, since the movement command at this time is for a movement from the movement starting point P1 to the movement ending point P3, the linear operation A having the movement starting point P1 as a starting point provides a linear operation which precedes the linear operation B having the movement ending point P3 as an ending point, thus the linear operation B being a linear operation which succeeds the linear operation A.

Once the preceding linear operation A and the succeeding linear operation B are determined, a virtual operation starting/ending point P2 as an intersecting point is searched.

The intersecting point P2 between the preceding linear operation A and the succeeding linear operation B provides a virtual operation ending point for the preceding linear operation A, and a virtual operation starting point for the succeeding linear operation B. The reason why it is defined as "virtual" is that the hand position 23a is not actually positioned at the point P2. In the present embodiment, a synthesized trajectory AB where the preceding linear operation A and the succeeding linear operation B are synthesized is generated in the middle of the preceding linear operation A and the succeeding linear operation B, thereby the hand position 23a being smoothly moved at high speed along the synthesized trajectory AB without being stopped at the virtual operation starting/ending point P2 in the middle.

In this way, the virtual operation starting/ending point P2 is calculated such that the virtual operation ending point for the preceding linear operation A to be performed from before the hand position 23a getting into the synthesized trajectory AB matches the virtual operation starting point for the succeeding linear operation B to be performed also after the hand position 23a getting out of the synthesized trajectory AB. This calculation is carried out by the virtual operation starting/ending point searching means 41. In this example, the virtual operation starting/ending point P2 is searched by calculation, however, the virtual operation starting/ending point P2 may be searched by teaching. For example, by actually operating the robot 10 to move the hand position 23a along the preceding linear operation A and the succeeding linear operation B, the virtual operation starting/ending point P2 can be taught. In this way, according to the embodiment, it is only necessary that the preceding linear operation A and the succeeding linear operation B be determined and the virtual operation starting/ending point P2 be searched, and there is no need for determining the synthesized trajectory AB by calculation or by teaching, whereby the arithmetic processing or the teaching operation can be made simply and easily, which allows the load on the CPU to be decreased, and the time required for preprocessing for the control to be drastically shortened (step 201).

Hereinbelow, the contents of the processing to be implemented during the control operation will be described. The following processing at step 202 of "Calculation of control positions of motors 11, 12 and 13 for respective linear operations A and B" and the processing at step 203 of "Calculation of target control positions of motors 11, 12, and 13 for moving hand position 23a along trajectory C" are implemented for each predetermined period during the control operation. The control positions of the motors 11, 12, and 13 corresponding to the linear operation A can be determined on the basis of the later described transform function FA for preceding operation, while the control positions of the motors 11, 12 and 13 corresponding to the linear operation B can be determined on the basis of the later described transform function FB for succeeding operation, and the transform functions FA and FB are previously prepared.

Calculation of Control Positions of Motors 11, 12 and 13 for Respective Linear Operations A and B)

Next, the control positions for preceding linear operation, A1nA, A2nA, and A3nA, of the respective motors 11, 12 and 13 for implementing the preceding linear operation A are calculated from the initial positions A1 sA, A2sA, and A3sA to the terminal positions A1EA, A2EA, and A3EA, and in addition, the control positions for succeeding linear operation, B1nB, B2nB, and B3nB, of the respective motors 11, 12, and 13 for implementing the succeeding linear operation B are calculated from the initial positions B1sB, B2sB, and B3sB to the terminal positions B1EB, B2EB, and B3EB such that the preceding linear operation A is ended at the virtual operation starting/ending point P2, and the succeeding linear operation B is started from the virtual operation starting/ending point P2 temporally before the preceding linear operation A being ended. This calculation is performed by the control value calculation means 42.

The motors 11, 12, and 13 are drive controlled for each predetermined control cycle, and the number of times the control cycle has come around is expressed by "n". The control cycle is defined in consideration of the cycle time of arithmetic processing for the controller 40, and the like.

Herein, some of the symbols used in this specification will be defined as follows.

nA: Control cycle at the nth time around from starting of movement in preceding linear operation A
nB: Control cycle at the nth time around from starting of movement in succeeding linear operation B
A1sA: Initial control position of motor 11 for implementing preceding linear operation A
A2sA: Initial control position of motor 12 for implementing preceding linear operation A
A3sA: Initial control position of motor 13 for implementing preceding linear operation A
A1nA: Current (nth time) control position of motor 11 for implementing preceding linear operation A
A2nA: Current (nth time) control position of motor 12 for implementing preceding linear operation A
A3nA: Current (nth time) control position of motor 13 for implementing preceding linear operation A
A1EA: Terminal control position of motor 11 for implementing preceding linear operation A
A2EA: Terminal control position of motor 12 for implementing preceding linear Operation A
A3EA: Terminal control position of motor 13 for implementing, preceding linear Operation A
B1sB: Initial control position of motor 11 for implementing succeeding linear operation B
B2sB: Initial control position of motor 12 for implementing succeeding linear operation B
B3sB: Initial control position of motor 13 for implementing succeeding linear operation B
B1nB: Current (nth time) control position of motor 11 for implementing succeeding linear operation B
B2nB: Current (nth time) control position of motor 12 for implementing succeeding linear operation B
B3nB: Current (nth time) control position of motor 13 for implementing succeeding linear operation B
B1EB: Terminal control position of motor 11 for implementing succeeding linear operation B
B2EB: Terminal control position of motor 12 for implementing succeeding linear operation B
B3EB: Terminal control position of motor 13 for implementing succeeding linear operation B Herein, the control positions for preceding linear operation, A1nA, A2nA, and A3nA (nA=sA, . . . , nA−1, nA, . . . , EA), and the control positions for succeeding linear operation, B1nB, B2nB, and B3nB (nB=sB, . . . , nB−1, nB, . . . , EB), can be calculated as the control positions of the motors 11, 12 and 13 corresponding to the hand position 23a, respectively. Generally, the consecutive positions of the hand position 23a (the positions of the defined axes) of the robot 10 and the control positions of the motors 11, 12, and 13 are in a one-to-one relationship, and by determining the consecutive positions of the hand position 23a by calculation or teaching, and inverse-transforming them on the basis of the inverse kinematics of the robot 10, the consecutive control positions of the motors 11, 12 and 13 corresponding to the consecutive hand position 23a can be determined as unique numerical values.

In this case, the control positions for preceding linear operation, A1nA, A2nA, and A3nA (nA=sA, . . . , nA−1, nA, . . . , EA), and the control positions for succeeding linear operation, B1nB, B2nB, and B3nB (nB=sB, . . . , nB−1, nB, . . . , EB), may be determined as angular positions corresponding to the consecutive band positions 23a that are expressed by numerical values, or may be determined as function values of a transform function which is prepared for calculating the consecutive motor control positions from the consecutive hand positions 23a.

For example, as can be seen from the following equations, $$A1nA = FA(1, nA)$$

$$A2nA = FA(2, nA)$$

$$A3nA = FA(3, nA)$$

$$B1nB = FB(1, nB)$$

$$B2nB = FB(2, nB)$$

$$B3nB = FB(3, nB) \qquad (1),$$

a transform function Fx (a, nX), i.e., a "function for calculating control position Xan for control cycle at the nth time around of motor 1a in operation X" is prepared, and as function values of the transform function, the consecutive operation control positions can be determined. The transform function is generally given as a function for calculating the control positions of the respective motors 11, 12 and 13 from the consecutive hand positions 23a.

As can be seen from the following equations.

$$B1sB = A1EA$$

$$B2sB = A2EA$$

$$B3sB = A3EA \qquad (2),$$

the initial positions B1sB, B2sB, and B3sB of the control positions for succeeding linear operation match the terminal positions A1EA, A2EA and A3EA of the control positions for preceding linear operation, respectively. This is because the virtual operation ending point for the preceding linear operation A matches the virtual operation starting point for the succeeding linear operation B at the point P2, and the hand position 23a is virtually positioned in the same point P2 in the respective operations.

Further, as described above, the timing at which the preceding linear operation A is ended is not the same as the timing at which the succeeding linear operation B is started, and the timing at which the succeeding linear operation B starts the movement from the virtual operation starting/ending point P2 is temporally before the preceding linear operation A ends the movement at the virtual operation starting/ending point P2, thereby the time at which the control is performed in the first time around control cycle (nB=sB) for the succeeding linear operation B is a time before the time at which the control is performed in the last time around control cycle (nA=EA) for the preceding linear operation A.

In this way, the control positions for preceding linear operation, A1n, A2n, and A3n, for implementing the preceding linear operation A from the point P1 to the point P2 are calculated from the initial positions A1s, A2s and A3s to the terminal positions A1E, A2E, and A3E, and the control positions for succeeding linear operation, B1n, B2n, and B3n, for implementing the succeeding linear operation B from the point P2 to the point P3 are calculated from the initial positions B1s, B2s and B3s to the terminal positions A1E, A2E, and A3E.

As described above, since the time at which the control is performed in the first time around control cycle (nB=sB) for the succeeding linear operation B is a time before the time at which the control is performed in the last time around control cycle (nA=EA) for the preceding linear operation A, both operations A and B overlap with each other. By overlapping both operations A and B at an optional desired timing, a synthesized trajectory AB substantially in the shape of a circular arc from the point F4 to the point P5 can be generated, and the hand position 23a can be moved along the synthesized trajectory AB.

FIG. 9 gives an example of speed change pattern for the preceding linear operation A and the succeeding linear operation B.

As shown in FIG. 9, the preceding linear operation A is performed from the time τ1 to the time τ3. The speed change pattern for the preceding linear operation A is uniquely dependent on the control positions A1nA, A2nA and A3nA, and the control cycle. Likewise, the succeeding linear operation B is performed from the time τ2 to the time τ4. The speed change pattern for the succeeding linear operation B is uniquely dependent on the control positions B1nB, B2nB and B3nB, and the control cycle.

Once the preceding linear operation A is started from the time τ1, the succeeding linear operation B is started from the time τ2 before the preceding linear operation A is ended at the time τ3. The period from the time τ1 to the time τ3 is a period when the synthesized trajectory AB is generated by overlapping the preceding linear operation A and the succeeding linear operation B. The speed change pattern for the synthesized trajectory AB is a pattern which synthesizes the speed change pattern for the preceding linear operation A and the speed change pattern for the succeeding linear operation B, in other words, a speed obtained by adding the respective speeds (for example, a fixed speed during a time period of τ2 to τ3).

As described above, according to the embodiment, since there is no need for determining the trajectory AB in the shape of a circular arc besides the linear trajectories corresponding to the linear operations A and B and for previously calculating the control positions of the motors 11, 12 and 13 corresponding to the trajectory AB in the shape of a circular arc, the arithmetic processing can be simply and easily implemented, which allows the load on the CPU to be decreased, and the time required for preprocessing for the control to be drastically shortened (step 202).

(Calculation of Target Control Positions of Motors 11, 12 and 13 for Moving Hand Position 23a Along Trajectory C)

Next, with a requirement as given by the above equation (2), that the initial positions B1sB, B2sB and B3s8 of the control positions for succeeding linear operation be matched to the terminal positions A1EA, A2EA and A3EA of the control positions for preceding linear operation, respectively, being added, the target control positions M1n, M2n and M3n of the respective motors 11, 12 and 13 for this time n for moving the hand position 23a along the trajectory C are calculated on the basis of the control positions for preceding linear operation and the control positions for succeeding linear operation as given by, for example, the above equation (1). This calculation is performed by the actuator target control value calculation means 43.

Herein, some of the symbols used in this specification will be defined as follows.

n: this time (nth time around) control cycle for respective motors 11, 12 and 13 n−1: a previous time (n−1 th time around) control, cycle for respective motors 11, 12, and 13

M1n: Target control position of motor 11 for this time n (nth time around control cycle)

M2n: Target control position of motor 12 for this time n (nth time around control cycle)

M3n: Target control position of motor 13 for this time n (nth time around control cycle)

The target control positions M1n, M2n and M3n of the respective motors 11, 12, and 13 for this time n (nth time around time cycle) are given by the following general equations:

$$M1n = M1n-1 + (A1nA - A1nA-1) + (B1nB - B1nB-1) \quad (3)$$

$$M2a = M2n-1 + (A2nA - A2nA-1) + (B2nB - B2nB-1) \quad (4)$$

$$M3n = M3n-1 + (A3nA - A3nA-1) + (B3nB - B3nB-1) \quad (5).$$

The target control positions M1n, M2n and M3n of the respective motors 11, 12, and 13 for this time n in the section where only the preceding linear operation A is performed, in other words, the section of P1 to P4 before the hand position 23a getting in the synthesized trajectory AB are given by the following equations, which are obtained by omitting the values of difference between the control position for succeeding linear operation for this time and the control position for succeeding linear operation for the previous time, i.e., (B1nB−B1nB−1), (B2nB−B2nB−1) and (B3nB−B3nB−1) from the above equations (3), (4) and (5), respectively:

$$M1n = M1n-1 + (A1nA - A1nA-1) \quad (6)$$

$$M2n = M2n-1 + (A2nA - A2nA-1) \quad (7)$$

$$M3n = M3n-1 + (A3nA - A3nA-1) \quad (8).$$

The target control positions M1n, M2n, and M3n of the respective motors 11, 12 and 13 for this time n in the section where the preceding linear operation A and the succeeding linear operation B are simultaneously performed, in other words, the section of P4 to P5 in which the hand position 23a is moved along the synthesized trajectory AB are calculated as given in the above equations (3), (4) and (5), based on the values (A1nA−A1nA−1)+(B1nB−B1nB−1), (A2nA−A2nA−1)+(B2nB−B2B−1) and (A3nA−A3nA−1)+(B3nB−B3nB−1), in other words, the values which are obtained by adding the values of difference between the control position for preceding linear operation for this time and the control position for preceding linear operation for the previous time, i.e., the values (A1nA−A1nA−1), (A2nA−A2nA−1), and (A3nA−A3nA−1), to the values of difference between the control position for succeeding linear operation for this time and the control position for succeeding linear operation for the previous time, i.e., (B1nB−B1nB−1), (B2nB−B2nB−1) and (B3nB−B3B−1), respectively. However, when the succeeding linear operation B is started in addition to the preceding linear operation A, the above equation (2), i.e., (B1sB=A1EA, B2sB=A2EA and B3sB=A3EA) is used to define the initial, target control positions M1n, M2n, and M3n of the respective motors 11, 12 and 13 at the time of starting the succeeding linear operation B.

The target, control positions M1n, M2n, and M3n of the respective motors 11, 12, and 13 for this time n in the section where only the succeeding linear operation B is performed, in other words, the section of P5 to P3 after the hand position 23a getting out of the synthesized trajectory AB are given by the following equations, which are obtained by omitting, from the above equations (3), (4) and (5), the values of difference between the control position for preceding linear operation for this time n and the control position for preceding linear operation for the previous time, i.e., (A1nA−A1nA−1), (A2nA−A2nA−1) and (A3nA−A3nA−1), respectively:

$$M1n = M1n-1 + (B1nB - B1nB-1) \quad (9)$$

$$M2n = M2n-1 + (B2nB - B2nB-1) \quad (10)$$

$$M3n = M3n-1 + (B3nB - B3nB-1) \quad (11).$$

As described above, the target control positions M1n, M2n, and M3n of the respective motors 11, 12 and 13 can be determined as synthesized values by using only the control positions for preceding linear operation and the control positions for succeeding linear operation as values synthesizing these, with no need for calculating and using the control positions for the trajectory AB in the shape of a circular arc alone, thereby the arithmetic processing can be simply and easily implemented, which allows the load on the CPU to be decreased, and the time required for preprocessing for the control to be drastically shortened (step 203).

(Control of Motors 11, 12, and 13)

Next, the above equations (3) to (11) are used to control the motors 11, 12, and 13 such that the target control positions M1n, M2n, and M3n are attained, respectively, thereby the hand position 23a being moved along the trajectory C. This control is performed by the control means 44.

Specifically, using the above equations (6), (7) and (8), the motors 11, 12 and 13 are drive controlled such that, for the respective control cycles from the initial control cycle (n=1), the target control positions M1n, M2n, and M3n are consecutively given as the positions of the respective motors 11, 12 and 13, respectively. This control is performed until the control cycle when the succeeding linear operation B is started. As a result of this, the hand position 23a is linearly moved from the movement starting point P1 to the point P4.

Next, with a requirement given by the above equation (2), i.e., (B1sB=A1EA, B2sB=A2EA, and B3sB=A3EA), being added, the above equations (3), (4) and (5) are used to drive control the motors 11, 12 and 13 such that, for the respective control cycles from the control cycle when the succeeding linear operation B is started, the target control positions M1n, M2n, and M3n are consecutively given as the positions of the respective motors 11, 12 and 13, respectively. This control is performed until the control cycle when the preceding linear operation A is ended. As a result of this, the hand position 23a is moved from the point P4 to the point P5 along the synthesized trajectory AB substantially in the shape of a circular arc.

Next, using the above equations (9), (10) and (11), the motors 11, 12 and 13 are drive controlled such that, for the respective control cycles from the control cycle when the preceding linear operation A is ended and the succeeding linear operation B is started, the target control positions M1n, M2n, and M3n are consecutively given as the positions of the respective motors 11, 12 and 13, respectively. This control is performed until the control cycle when the succeeding linear operation B is ended. As a result of this, the hand position 23a is linearly moved from the point P5 to the movement ending point P3.

As described above, the hand position 23a is moved from the movement starting point P1 to the movement ending point P3 along the trajectory C including the synthesized trajectory AB, whereby the workpiece W can be smoothly transferred at high speed (step 204).

As described above, according to this embodiment, in moving the hand position 23a along the synthesized trajectory AB where the two linear operations A and B are synthesized in the middle of a desired trajectory C, the control positions on the synthesized trajectory AB are determined from the control values for preceding operation and the control values for succeeding operation, and there is no need for previously determining the synthesized trajectory. The control positions for preceding operation and the control positions for succeeding operation are obtained for each predetermined control cycle during the control operation, and there is no need for the preprocessing which previously determines these control values and stores them in a predetermined memory.

Therefore, the time required for the preprocessing which previously calculates the synthesized trajectory can be shortened. Further, it is only necessary that the transform function for preceding operation FA for determining the control positions for preceding operation, and the transform function for succeeding operation FB for determining the control positions for succeeding operation be previously prepared, and there is no need for preparing a special function for determining the control positions on the synthesized trajectory.

In this way, according to the present embodiment, there is no need, in moving the tool along the synthesized trajectory AB where at least two operations are synthesized in the middle of a desired trajectory, for the preprocessing which previously determines the synthesized trajectory AB, and a special function for determining the control positions on the synthesized trajectory AB, whereby the processing time required for preprocessing for the robot control can be drastically shortened. As a result of this, the load of the arithmetic processing is reduced, which allows simplification of the robot control system.

Further, with the present embodiment, only from the function values of the transform function for preceding operation FA and the transform function for succeeding operation FB, the consecutive control positions for the entire trajectory including the synthesized trajectory AB are determined. Herein, with the conventional art, once a synthesized trajectory is attained, arithmetic processing using a special function for determining the control positions on the synthesized trajectory is newly added as a calculation load in order to determine the control positions on the synthesized trajectory, thereby a calculation apparatus having a high throughput (a CPU having a high throughput) has been required, however, according to the present embodiment, a calculation apparatus having a relatively low throughput (a CPU with a relatively low throughput) will suffice.

In the above description, the case where the hand position 23a is moved along the synthesized trajectory AB where the two linear operations A and B are synthesized has been taken as an example for explanation. However, it is, of course, possible to move the hand position 23a along a synthesized trajectory where a linear operation and a turning operation are synthesized.

FIG. 10 exemplifies a trajectory C which includes, in the middle, a synthesized trajectory AD where a linear operation A and a turning operation D are synthesized, and a synthesized trajectory DB where a turning operation D and a linear operation B are included. FIG. 10 gives a trajectory corresponding to FIG. 2 that has been explained as a conventional art.

Specifically, a case is assumed where the linear operation A of the hand position 23a is performed from the movement starting point P1 toward the point P2; then the hand position 23a is moved from the point P5 on this side of the point P2 to the point P6 along the synthesized trajectory AD such that the point P2 is bypassed or "shortcut"; then, the turning operation D of the hand position 23a is performed from the point P6 toward the point P3; then, from the point P7 on this side of point P3 to the point PS, the hand position 23a is moved to the point P8 along the synthesized trajectory DB such that the point P3 is bypassed or "shortcut"; and then, the linear operation B of the hand position 23a is performed from the point P8 to the movement ending point P4, thus the workpiece W being transferred from one process chamber to the other process chamber.

Also in this case, the control can be performed in the same manner as in the above-described embodiment. Hereinbelow, any duplicated detailed explanation will be omitted.

(Searching of Virtual Operation Starting/Ending Points P2 and P3)

About Searching of Virtual Operation Starting/Ending Point P2 for the Movement Along Synthesized Trajectory AD The virtual operation starting/ending point P2 is searched such that the virtual operation ending point for the preceding linear operation A to be performed from before the hand position 23a getting into the synthesized trajectory AD matches the virtual operation starting point for the succeeding turning operation D to be also performed after the band position 23a getting out of the synthesized trajectory AD.

About Searching of Virtual, Operation Starting/Ending Point P3 for the Movement Along Synthesized Trajectory DB The virtual operation starting/ending point P3 is searched such that the virtual operation ending point for the preceding turning operation D to be performed from before the hand position 23a getting into the synthesized trajectory DB matches the virtual operation starting point for the succeeding linear operation B to be also performed after the band position 23a getting out of the synthesized trajectory DB.

(Calculation of Control Positions of Motors 11, 12, and 13 for each of Linear Operation A, Turning Operation D, and Linear Operation B)

Calculation of Motor Control Positions for the Movement Along Synthesized Trajectory AD The control positions for preceding linear operation, A1nA, A2nA and A3nA, of the respective motors 11, 12 and 13 for implementing the preceding linear operation A are calculated from the initial positions A1sA, A2sA, and A3sA to the terminal positions A1EA, A2EA and A3EA, and in addition, the control positions for succeeding turning operation D1nD, D2nD and D3nD of the respective motors 11, 12 and 13 for implementing the succeeding turning operation D are calculated from the initial positions D1sD, D2sD and D3sD to the terminal positions D1ED, D2ED, and D3ED such that the preceding linear operation A is ended at the virtual operation starting/ending point P2 and the succeeding turning operation D is started from the virtual operation starting/ending point P2 temporally before the preceding linear operation A being ended.

The detailed calculation is given by the above equations (1) and (2) with which the letter "B" is replaced with the letter "D".

Calculation of Motor Control Positions for the Movement Along Synthesized Trajectory DB The control positions for preceding turning operation D1nD, D2nD and D3nD of the respective motors 11, 12, and 13 for implementing the preceding turning operation D are calculated from the initial positions D1sD, D2sD, and D3sD to the terminal positions D1ED, D2ED and D3ED, and in addition, the control positions for succeeding linear operation, B1nB, B2nB and B3nB, of the respective motors 11, 12 and 13 for implementing the succeeding linear operation B are calculated from the initial positions B1sB, B2sB and B3sB to the terminal positions B1EB, B2EB and B3EB such that the preceding turning operation D is ended at the virtual operation starting/ending point P3, and the succeeding linear operation B is started from the virtual operation starting/ending point P3 temporally before the preceding turning operation D being ended.

The detailed calculation is given by the above equations (1) and (2) with which the letter "A" is replaced with the letter "D".

Any duplicated calculation about the turning operation D may, of course, be omitted.

(Calculation of Target Control Positions of Motors 11, 12, and 13 for Moving Hand Position 23a Along Trajectory C)

Calculation of Motor Target Control Positions for the Movement Along Synthesized Trajectory AD With a requirement that the initial positions D1sD, D2sD and D3sD of the control positions for succeeding turning operation be matched to the terminal positions D1ED, D2ED, and D3ED of the control positions for preceding linear operation, respectively, being added, the target control positions M1n, M1n, and M3n of the respective motors 11, 12 and 13 for this time n for moving the hand position 23a along the trajectory C are calculated on the basis of the control positions for preceding linear operation and the control positions for succeeding turning operation.

The detailed calculation is given by the above equations (2) to (11) with which the letter "B" is replaced with the letter "D".

Calculation of Motor Target Control Positions for the Movement Along Synthesized Trajectory DB With a requirement that the initial positions B1sB, B2sB and B3sB of the control positions for succeeding linear operation be matched to the terminal positions D1ED, D2ED and D3ED of die control positions for preceding taming operation, respectively, being added, the target control positions M1n, M2n and M3n of the respective motors 11, 12 and 13 for this time n for moving the hand position 23a along the trajectory C are calculated on the basis of the control positions for preceding turning operation and the control positions for succeeding linear operation.

The detailed calculation is given by the above equations (2) to (11) with which the letter "A" is replaced with the letter "D".

Any duplicated calculation about the turning operation D may, of course, be omitted.

(Control of Motors 11, 12 and 13)

Next, the equations (3) to (11) with which letter replacement has been made as described above are used to control the motors 11, 12 and 13 such that the target control positions M1n, M2n, and M3n are attained, respectively, thereby the hand position 23a being moved along the trajectory C.

As a result of this, the hand position 23a is linearly moved from the movement starting point P1 to the point P5; then is moved from the point P5 to the point P6 along the synthesized trajectory AD substantially in the shape of a circular arc; then makes a turning movement from the point P6 to the point P7; then is moved from the point P7 to the point P8 along the synthesized trajectory DB substantially in the shape of a circular arc; and then is linearly moved from the point P8 to the movement ending point P4.

Therefore, the workpiece W is smoothly transferred at high speed, while there is no need for the preprocessing which previously determines the synthesized trajectories AD and DB and a special function for determining the control values on the synthesized trajectories AD and DB, whereby the processing time required for preprocessing for the robot control can be drastically shortened, and as a result of this, the load of the arithmetic processing is reduced, which allows simplification of the robot control system.

In the above description, an example of synthesizing a linear operation and a linear operation, and an example of synthesizing a linear operation and a turning operation have been used for explanation, however, these are nothing but examples, and an embodiment in which any operations are synthesized in the same manner is, of course, possible. Further, examples in which two operations are synthesized have been used for explanation, however, an embodiment in which three or more operations are synthesized in the same manner is, of course, possible.

The case where a linear operation, a turning operation, and the like are implemented as a composite operation by a plurality of motors, and they are synthesized has been taken as an example for explanation. However, an embodiment in which an operation by a single motor and an operation by a single motor are synthesized is, of course, possible.

Herein, there is a concept of virtual motor. The virtual motor is a concept that, in correspondence to a specific operation of a robot, a dedicated motor could be provided. For example, it is imagined that when the hand is to be linearly moved, a virtual motor for linearly moving the hand could he used, while, when the hand is to make a turning operation, a virtual motor for the hand making a turning operation could be used. The present invention is also applicable to virtual motors.

For example, in a case where the hand position 23a is to be moved along the synthesized trajectory shown in FIG. 10, a virtual motor corresponding to the linear operation and a virtual motor corresponding to the turning operation are designated, and the control values for preceding linear operation (straight motion positions) and the control values for succeeding turning operation (turning angles) may be calculated as the control values for the virtual motor corresponding to the preceding operation and as the control values for the virtual motor corresponding to the succeeding turning operation, respectively.

In the above embodiments, a horizontally articulated robot has been assumed as a robot for explanation, but this is nothing but an exemplification, and this invention is also applicable to any types of robot, such as a vertically articulated robot.

Further, in the embodiments, as an actuator for driving the robot, motors have been assumed, however, the present invention is, of course, applicable to robots which are driven by any other types of actuator, such as a cylinder. Furthermore, as the medium for driving the actuator, any medium, such as electricity, oil pressure, and air pressure, can, of course, be used. Still further, a workpiece transfer robot having a hand as a tool has been assumed for explanation, however, the present invention is not limited to the workpiece transfer robot, and is, of course, applicable to robots having any other types of tool, such as a torch for welding operation, a torch for cutting operation, and the like.

Figure 1:
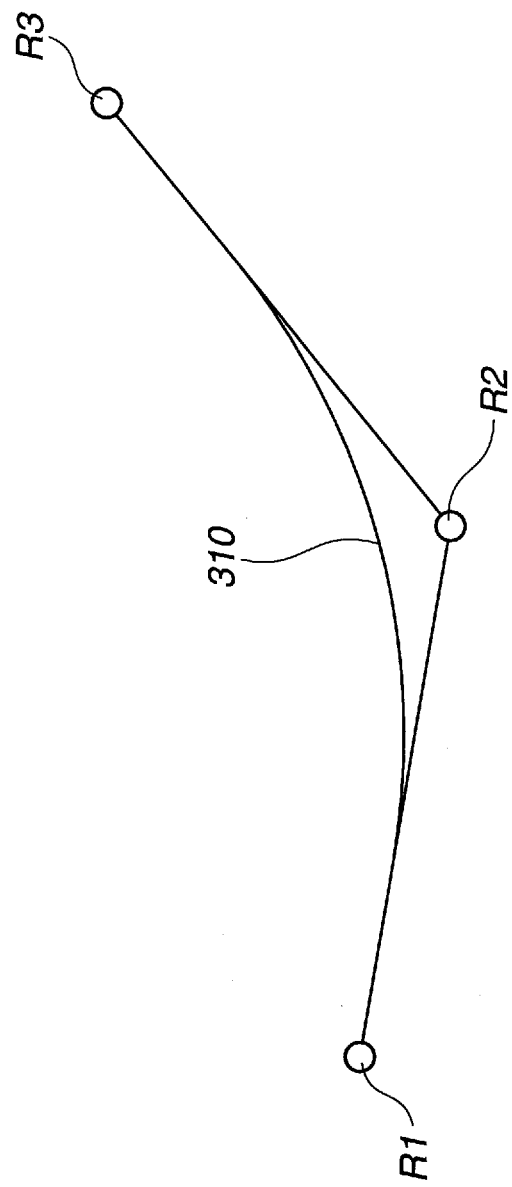
FIG. 1 is a drawing for explanation of conventional art 1.
Figure 2:
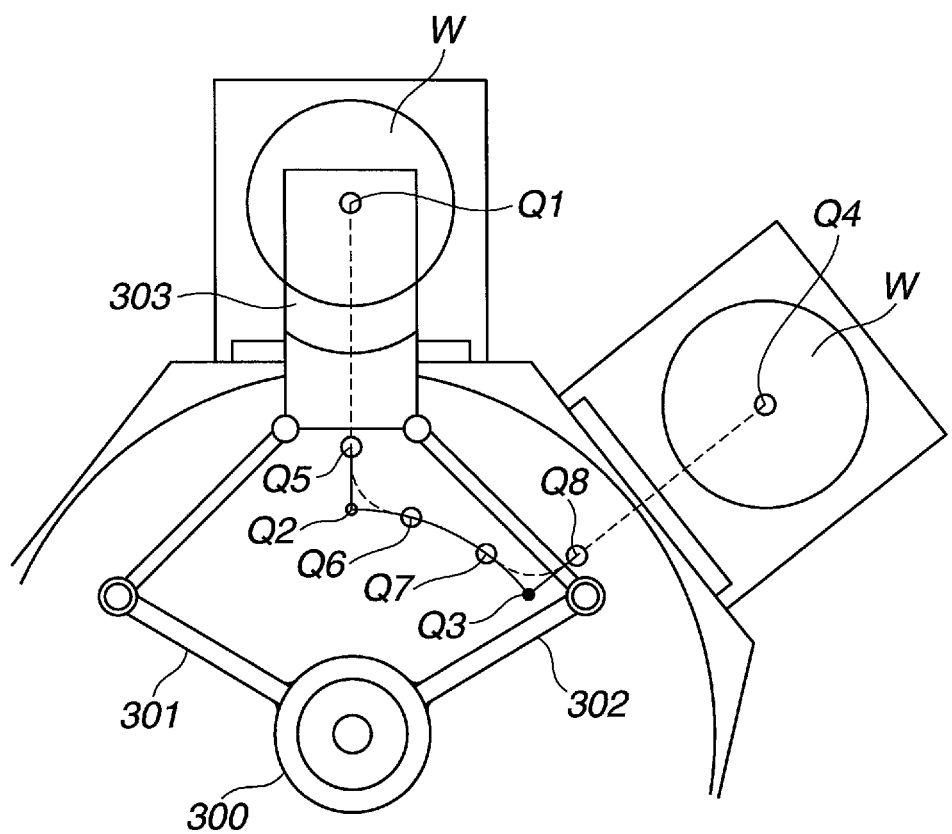
FIG. 2 is a drawing for explanation of conventional art 2.
Figure 3:
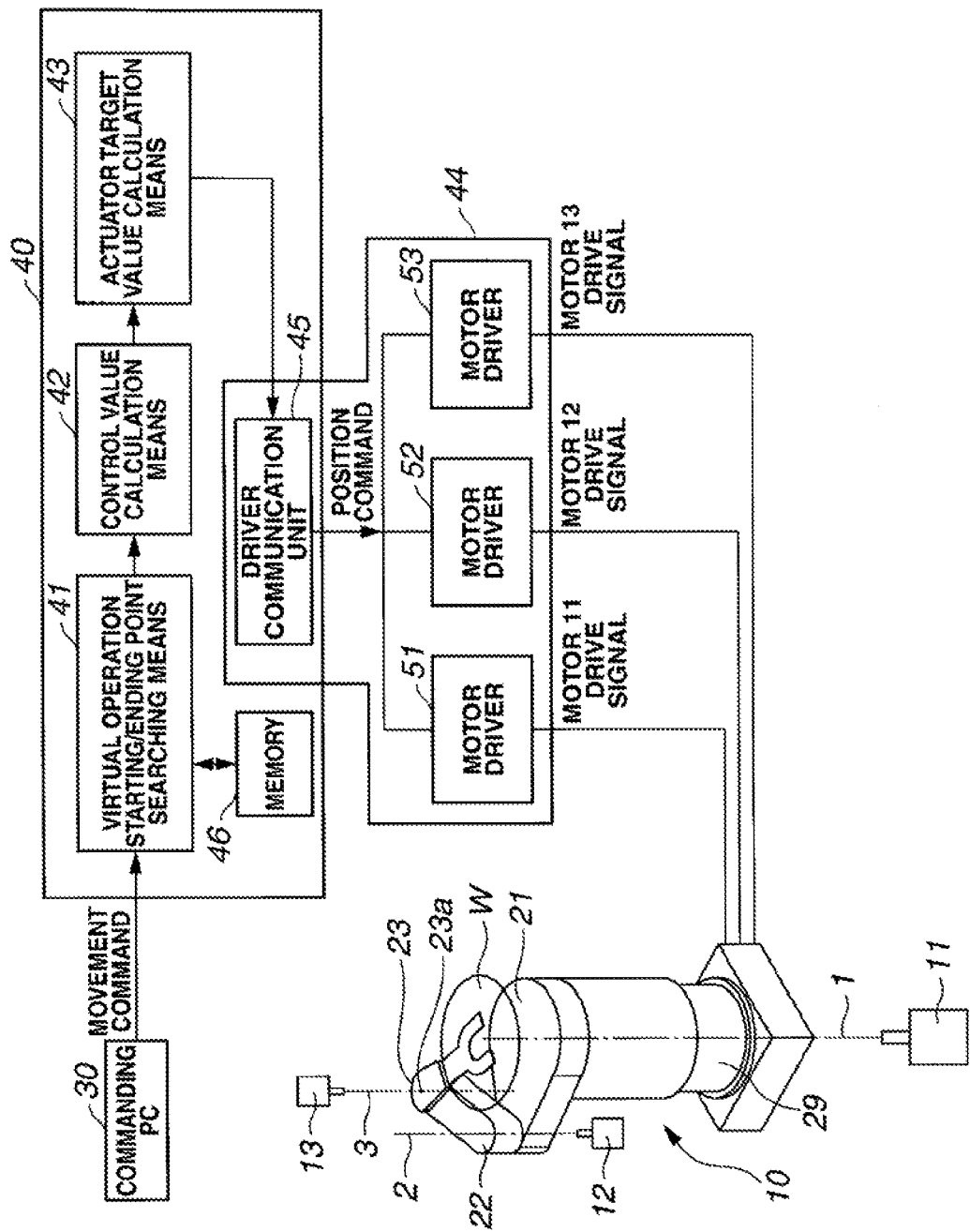
FIG. 3 is a drawing illustrating a configuration of a robot control system according to an embodiment.
Figure 4A:
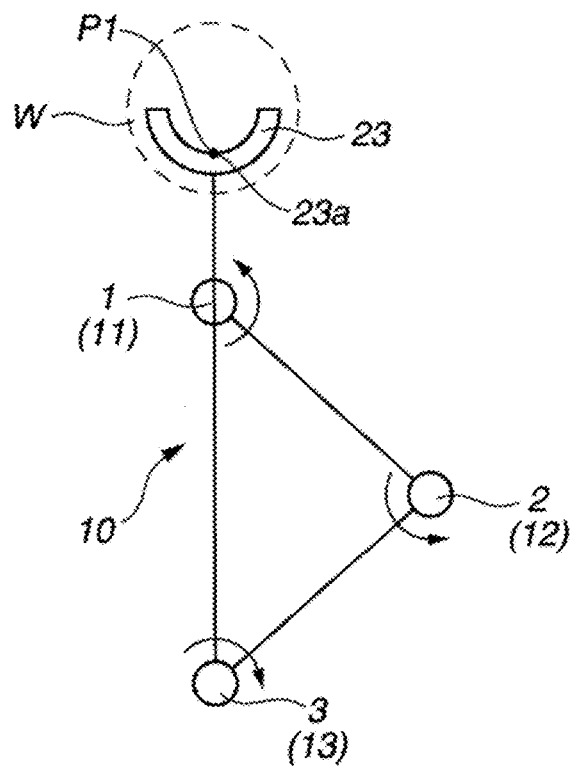
FIGS. 4A and 4B am drawings conceptually showing the motion of a robot in a horizontal plane.
Figure 4B:
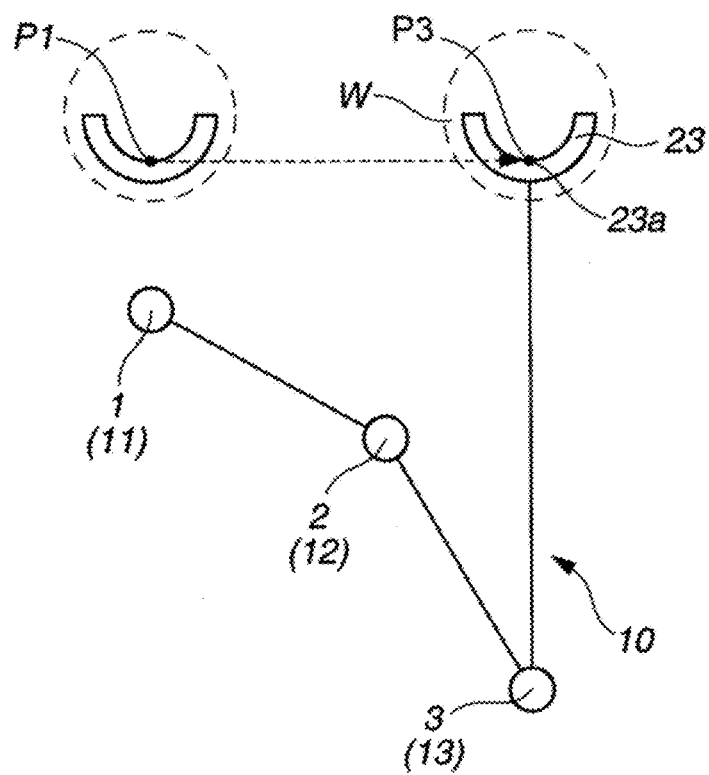
Figure 5A:
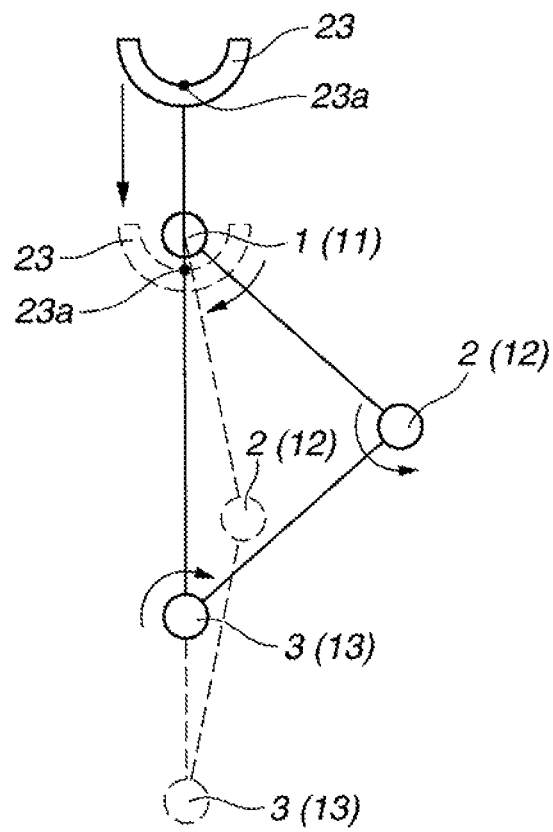
FIGS. 5A and 5B illustrate the relationship between, the trajectory and the drive control command for the respective motors in a case where the hand position makes a linear operation and in a case where the hand position makes a turning operation, respective.
Figure 5B:
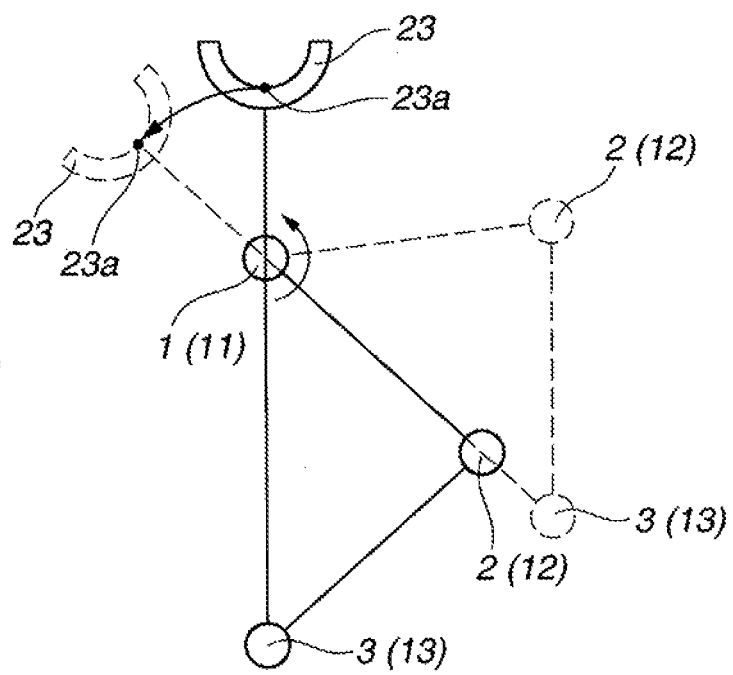
Figure 6:
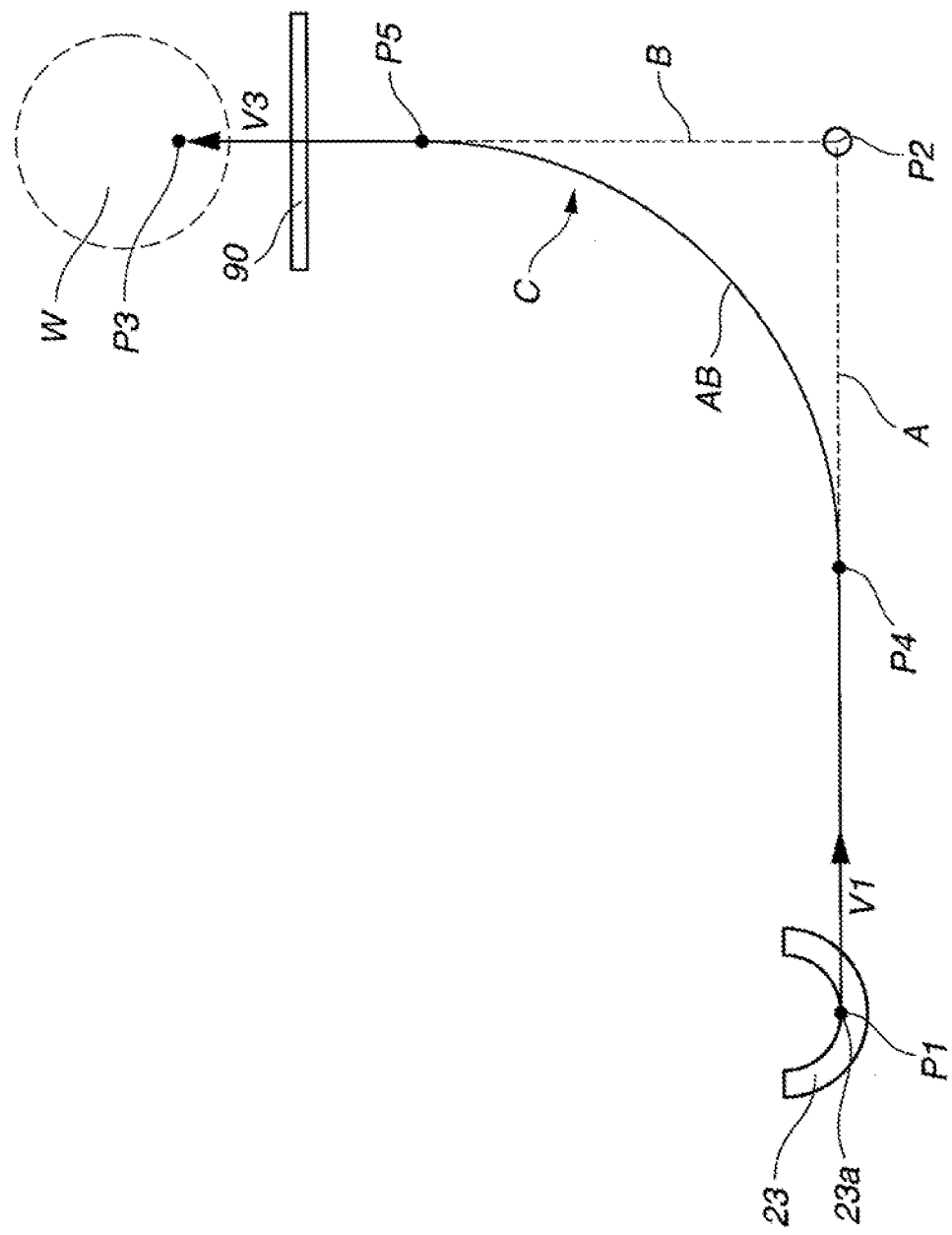
FIG. 6 is a drawing giving an example of trajectory in the embodiment.
Figure 7:
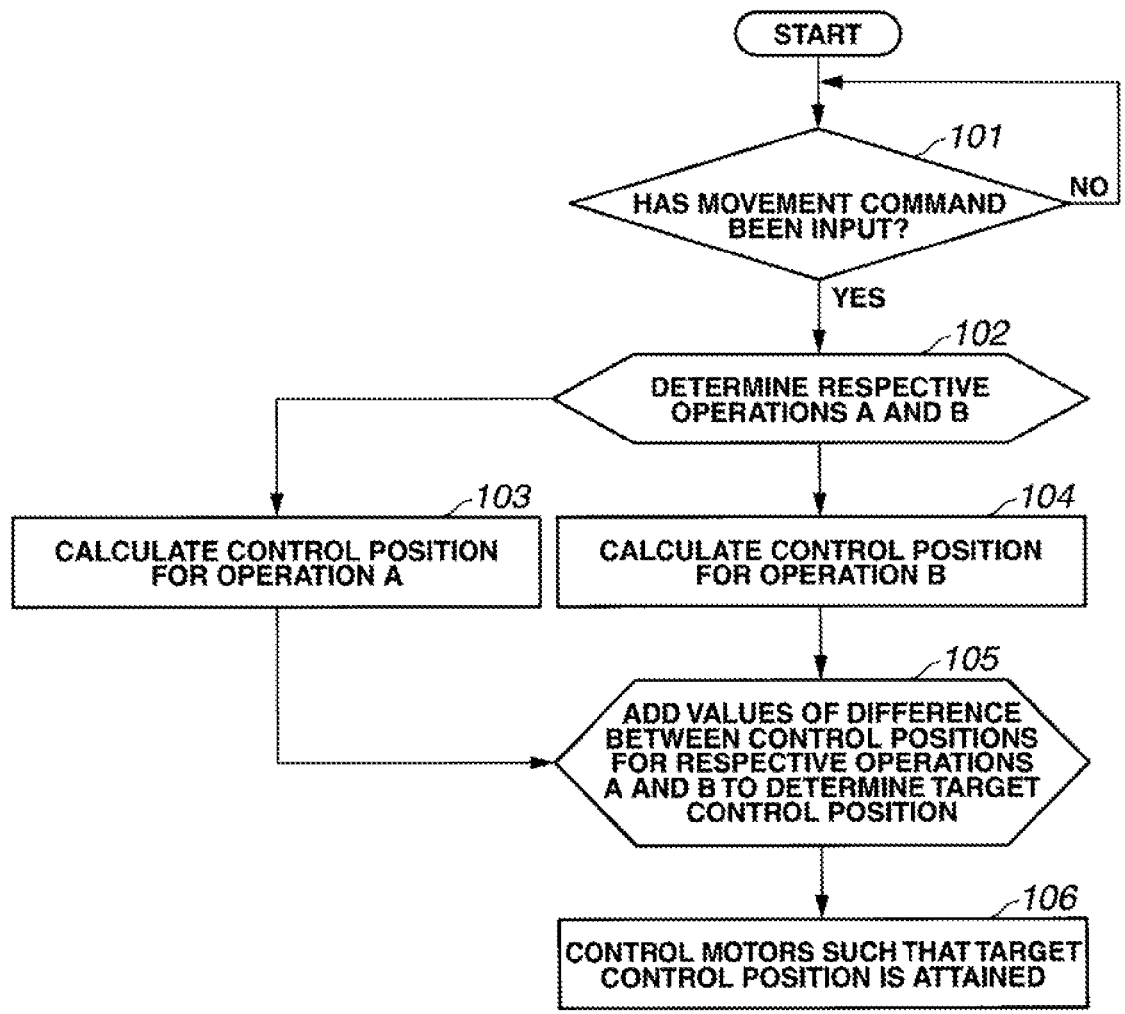
FIG. 7 is a flowchart schematically illustrating the flow of processing in the embodiment.
Figure 8:
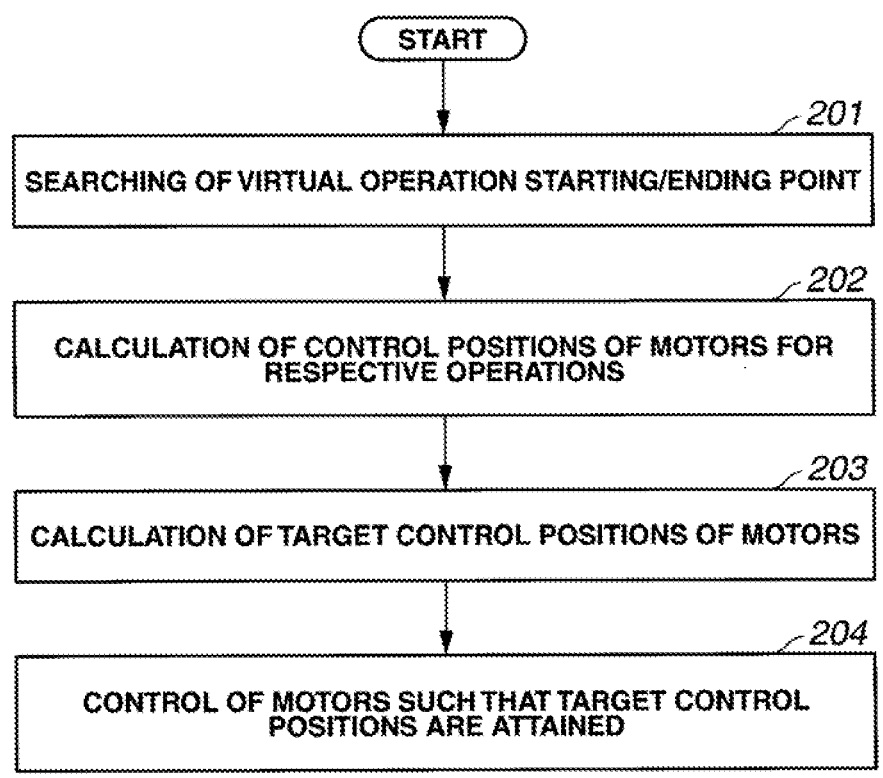
FIG. 8 is a flowchart illustrating the processing in FIG. 7 in detail.
Figure 9:
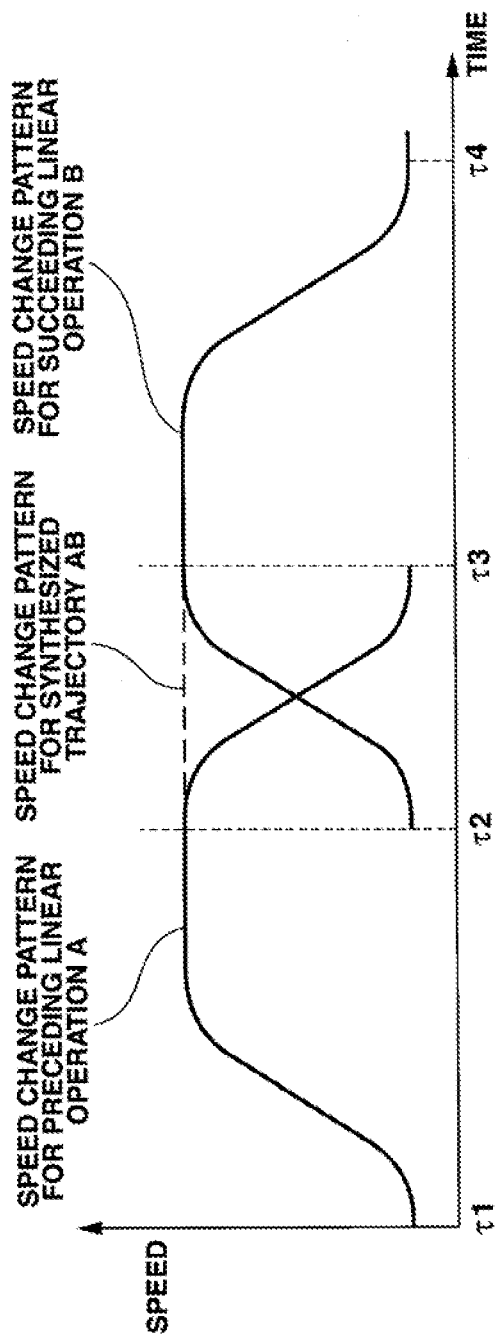
FIG. 9 is a drawing giving an example of speed change pattern for the preceding linear operation and the succeeding linear operation.
Figure 10:
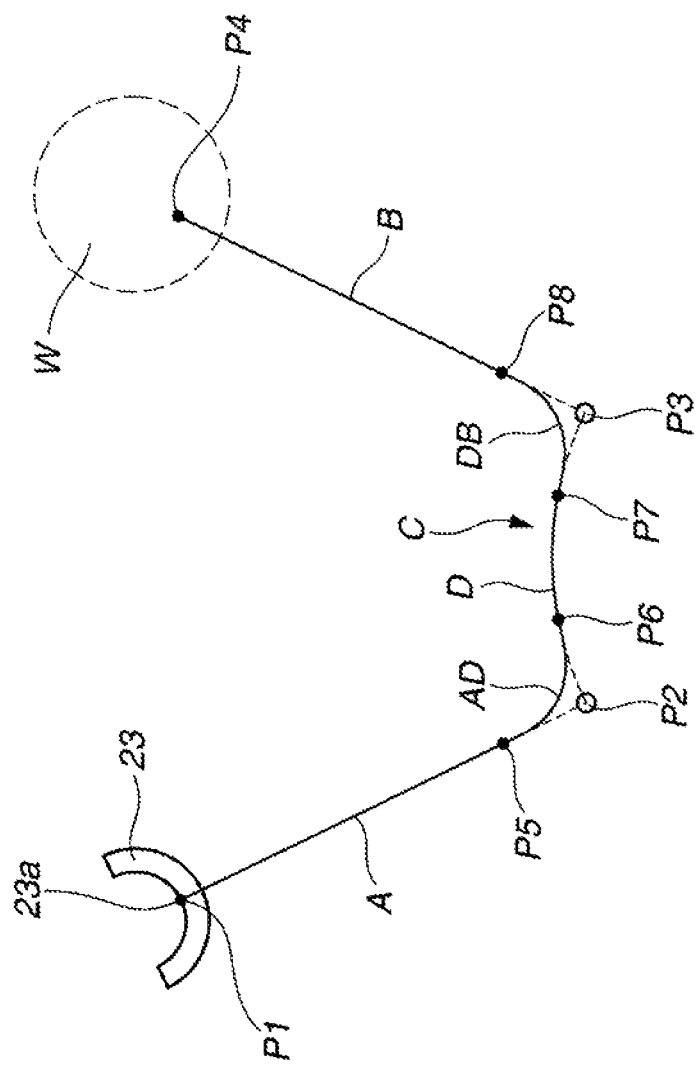
FIG. 10 is a drawing showing the same trajectory as that in FIG. 2.

The invention claimed is:
1. A robot control apparatus, having an actuator, and changing a control position for the actuator for each predetermined control cycle for shifting a tool of a robot from a movement starting point to a movement ending point along a desired trajectory,
the control apparatus, being applied in moving the tool along a synthesized trajectory where at least two operations are synthesized in a middle of the desired trajectory, and comprising:
virtual operation starting/ending point searching means that searches a virtual operation starting/ending point such that a virtual operation ending point for a preceding operation to be performed before the tool gets into the synthesized trajectory matches a virtual operation starting point for a succeeding operation to be performed after the tool gets out of the synthesized trajectory;
control position calculation means that calculates a control position for each control cycle for the preceding operation for implementing the preceding operation from an initial value to a terminal value, and calculating a control position for each control cycle for the succeeding operation for implementing the succeeding operation from an initial value to a terminal value such that the preceding operation is ended at the virtual operation starting/ending point, and the succeeding operation is started from the virtual operation starting/ending point temporally before the preceding operation ends;
actuator target control position calculation means that calculates, with a requirement that the initial value of the control position for the succeeding operation be matched to the terminal value of the control position for the preceding operation, a target control position at a predetermined time for the actuator in a section where the tool is moved along the synthesized trajectory, on a basis of a value obtained by adding a value of a difference between the control position for the preceding operation at the predetermined time and the control position for the preceding operation at a time before the predetermined time by a time interval equivalent to the control cycle to a value of a difference between the control position for the succeeding operation at the predetermined time and the control position for the succeeding operation at the time before the predetermined time by a time interval equivalent to the control cycle; and
control means that controls the actuator such that the calculated target control position is attained, such that the tool is moved along the synthesized trajectory.

2. The robot control apparatus of claim 1, wherein the robot is a workpiece transfer robot having a hand for transferring a workpiece as the tool.

3. The robot control apparatus of claim 1, wherein the actuator is a plurality of motors, and
the control position for the preceding operation and the control position for the succeeding operation are calculated as control positions of the plurality of motors corresponding to a position of the tool, respectively.

4. The robot control apparatus of claim 1, wherein the actuator is a plurality of virtual motors,
the virtual motors are designated in correspondence to the at least two operations, and the control position for the preceding operation and the control position for the succeeding operation are calculated as control positions for the virtual motors corresponding to the preceding operation and control positions for the virtual motors corresponding to the succeeding operation, respectively.

5. The robot control apparatus of claim 1, wherein the control position for the preceding operation and the control position for the succeeding operation are calculated as function values for each consecutive control cycle, respectively.

6. A robot control method for a robot having an actuator, changing a control position for the actuator for each predetermined control cycle for shifting a tool of the robot from a movement starting point to a movement ending point along a desired trajectory, the control method, being applied in moving the tool along a synthesized trajectory where at least two operations are synthesized in a middle of the desired trajectory, and comprising:

calculating a virtual operation starting/ending point such that a virtual operation ending point of a preceding operation to be performed before the tool gets into the synthesized trajectory matches a virtual operation starting point of a succeeding operation to be performed after the tool gets out of the synthesized trajectory, calculating a control position for each control cycle for the preceding operation for implementing the preceding operation from an initial value to a terminal value, and calculating a control position for each control cycle for the succeeding operation for implementing the succeeding operation from an initial value to a terminal value such that the preceding operation is ended at the virtual operation starting/ending point, and the succeeding operation is started from the virtual operation starting/ending point temporally before the preceding operation ends;

calculating, with a requirement that the initial value of the control position for the succeeding operation be matched to the terminal value of the control position for the preceding operation, a target control position at a predetermined time for the actuator in a section where the tool is moved along the synthesized trajectory, on a basis of a value obtained by adding a value of a difference between the control position for the preceding operation at the predetermined time and the control position for the preceding operation at the time before the predetermined time by a time interval equivalent to the control cycle to a value of a difference between the control position for the succeeding operation at the predetermined time and the control position for the succeeding operation at the time before the predetermined time by a time interval equivalent to the control cycle; and controlling the actuator such that the calculated target control position is attained, such that the tool is moved along the synthesized trajectory.

7. The robot control apparatus of claim 1, wherein a transform function for the preceding operation to calculate the control position for the preceding operation from the initial value to the terminal value is previously prepared, while a transform function for the succeeding operation to calculate the control position for the succeeding operation from the initial value to the terminal value is previously prepared, and for each predetermined control cycle, the transform function for the preceding operation is used to calculate the control position for the preceding operation, while the transform function for the succeeding operation is used to calculate the control position for the succeeding operation.

8. The robot control method of claim 6, wherein a transform function for the preceding operation to calculate the control position for the preceding operation from the initial value to the terminal value is previously prepared, while a transform function for the succeeding operation to calculate the control position for the succeeding operation from the initial value to the terminal value is previously prepared, and for each predetermined control cycle, the transform function for the preceding operation is used to calculate the control position for the preceding operation, while the transform function for the succeeding operation is used to calculate the control position for the succeeding operation.

9. The robot control apparatus of claim 2, wherein the actuator is a plurality of motors, and the control position for the preceding operation and the control position for the succeeding operation are calculated as control positions of the plurality of motors corresponding to a position of the tool, respectively.

10. The robot control apparatus of claim 2, wherein the actuator is a plurality of virtual motors, the virtual motors are designated in correspondence to the at least two operations, and the control position for the preceding operation and the control position for the succeeding operation are calculated as control positions for the virtual motors corresponding to the preceding operation and control positions for the virtual motors corresponding to the succeeding operation, respectively.

11. The robot control apparatus of claim 2, wherein the control position for the preceding operation and the control position for the succeeding operation are calculated as function values for each consecutive control cycle, respectively.

12. The robot control apparatus of claim 3, wherein the control position for the preceding operation and the control position for the succeeding operation are calculated as function values for each consecutive control cycle, respectively.

13. The robot control apparatus of claim 4, wherein the control position for the preceding operation and the control position for the succeeding operation are calculated as function values for each consecutive control cycle, respectively.

* * * * *